United States Patent Office 2,923,716
Patented Feb. 2, 1960

2,923,716

PROCESS FOR THE PREPARATION OF THIOCHROMONES

Friedrich Bossert, Wuppertal-Elberfeld, Germany, assignor to Farbenfabriken Bayer Aktiengesellschaft, Leverkusen, Germany, a corporation of Germany No Drawing. Application July 3, 1956
Serial No. 595,603

Claims priority, application Germany July 6, 1955

1 Claim. (Cl. 260—327)

The present invention relates to thiochromones and more particularly to an improved process of producing the same.

Up to now the thiochromones described in literature have chiefly been prepared via the corresponding thiochromanones. Thus, F. Arndt, Ber. vol. 58, 1612 (1925), obtained thiochromone itself by bromination or chlorination of the thiochromanone into the 3-halo-thiochromanone and splitting off of hydrogen halide. F. Arndt, Ber., vol. 56, page 1269 (1923), obtained also 3-hydroxy-thiochromone (thiochromonol) by condensation of thiochromanone with p-nitrosodimethylaniline and splitting off of the condensation product. H. Simonis and A. Elias, Ber., vol. 49, page 768 (1916), obtained the 2.3-dimethyl-thiochromone without the intermediary of the corresponding thiochromanone by heating thiophenol and α-methylaceto-acetic ester with phosphorus pentoxide. However, by this method dimethyl-thiochromone is produced only in a small yield on account of strong decomposition.

It is therefore an object of the present invention to provide a process for the production of thiochromones which is easy to carry out and by which thiochromones are obtained in good yield.

A further object is the provision of a process, which yields pure thiochromones and avoids the formation of decomposition- and by-products.

Still another object is the provision of novel thiochromones which cannot be obtained by the processes hitherto used in the art.

Further objects will become apparent as the following specification proceeds.

According to the invention thiochromones are easily obtained in good yield without the formation of by-products by condensing thiophenol and α-acyl fatty acid esters in the presence of polyphosphoric acid. The temperature and concentration of the polyphosphoric acid to be used depend in each case on the nature of the components. On diluting with water, the reaction products precipitate out nearly pure and can be obtained completely pure by a single re-crystallization.

The thiophenol itself may bear in its nucleus any substituent such as alkyl-, halogen-, alkoxy-, hydroxy-, nitro-, acetamino-, amino groups provided that an o-position to the mercapto group is unsubstituted.

As α-acyl fatty acid esters there may generally be considered any compounds of the formula

R—CO—CH—COOR''
       |
       R' wherein R is hydrogen, alkyl, cycloalkyl, heterocycloalkyl, aryl, heteroaryl or carbalkoxy, R' is hydrogen, alkyl, alkoxy, hydroxy, acyloxy, halogen or aryl, and R'' is a low molecular weight alkyl radical. The radical R and R' may also be members of a homocyclic or heterocyclic ring system so that the α-acylalkonoic acid esters may have the general formula $$\bigcirc\!\!\!\!-\overset{\overset{\displaystyle O}{\|}}{C}\!\!-\!\!CH\!\!-\!\!COOR''$$

The compounds thus obtained can be illustrated by the formula wherein R and R' have the meaning above indicated. The aromatic ring itself may carry one or more substituents.

The temperature range, in which my new process can be carried out is between about 15 to about 150° C. The best results are obtained at temperatures between 40 and 100° C.

The amount of polyphosphoric acid present as a condensation catalyst may vary to a great degree. However, an amount of polyphosphoric acid at least equal to the amount of the thiophenol employed should be present in the reaction mixture. The compounds obtainable according to the new process are useful as intermediates for the manufacture of drugs, dyestuffs and agricultural chemicals.

Example 1

To polyphosphoric acid (70 milliliters of phosphoric acid, d 1.75 and 130 grams of phosphorus pentoxide) a mixture of 15 milliliters of thiophenol and 15 milliliters of ethyl acetoacetate is added at 70° C. The temperature remains unchanged. When the reaction is completed, the product is introduced into ice-water with stirring, the 2-methylthiochromone thus formed is filtered off with suction and washed successively with water, sodium hydroxide and water. On recrystallization from a mixture of benzene and petroleum ether crystals of M.P. 105° C. are obtained.

Example 2

15 milliliters of thiophenol and 18 milliliters of α-methylethyl aceto acetate are heated in the same amount of polyphosphoric acid as in Example 1 to 120° C. for one hour. The mixture is introduced into ice-water, the 2.3-dimethylthiochromone thus formed is filtered off with suction and washed. On recrystallization from ligroin, crystals of M.P. 110° are obtained.

Example 3

15 milliliters of 2.5-dimethyl-thiophenol and 20 milliliters of ethyl aceto acetate are added dropwise to the same amount of polyphosphoric acid as in Example 1 at 70° C. so that the temperature remains unchanged. The product is then heated on a water bath for one hour. The 2.5.8-trimethyl-thiochromone formed is recovered as described in Example 2. By recrystallization from ligroin, crystals of M.P. 89–90° C. are obtained.

Example 4

15 milliliters of 2-methyl-5-chlorothiophenol and 15 milliliters of ethyl aceto acetate are heated in the same amount of polyphosphoric acid as in Example 1 to 100° C. for two hours. The recovery of the 2.8-dimethyl-5-chlorothiochromone is carried out as in Example 2. From ligroin, crystals of M.P. 130–131° C. are obtained.

Example 5

To polyphosphoric acid (prepared as indicated in Example 1) a solution of 15 grams of 2-ethyl-5-acetaminothiophenol in 20 milliliters of ethyl aceto acetate is introduced drop by drop at 80° C. The temperature remains at between 80 and 90° C. When the reaction is completed, the product is briefly heated to 90° C. and introduced into ice-water. The 2.8-dimethyl-5-acetaminothiochromone thereupon precipitates. On recrystallization from alcohol, crystals of M.P. 164–165° C. are obtained.

From the 2.8-dimethyl-5-acetamino-thiochromone the 2.8-dimethyl-5-aminothiochromone of M.P. 170–171° C. is obtained by saponification with hydrochloric acid.

The 2-methyl-5-acetamino-thiophenol of the approximate M.P. 90° C. was prepared by reduction of the sulphochloride (from p-acetyltoluidine and chlorosulphonic acid, M.P. 120–124° C.) with zinc dust.

Example 6

A solution of 15 grams of 2-methyl-5-acetamino-thiophenol in 18 milliliters of α-methyl ethyl aceto acetate is introduced at 90° C. into polyphosphoric acid of the composition described in Example 1 and then heated to 100° C. for 10 minutes. On recrystallization from alcohol, the 2.3.4-trimethyl-5-acetamminothiochromone thus obtained forms crystals of M.P. 175–176° C.

Example 7

A mixture of 10 milliliters of thiophenol and 14 milliliters of benzoyl ethyl acetate is added dropwise at 70° C. to polyphosphoric acid and the product is heated on a water bath for a further 15 minutes. The thioflavone is obtained which melts at 125° C. on recrystallization from alcohol.

Example 8

10 milliliters of 2.5-dimethoxy-thiophenol and 12 milliliters of ethyl aceto acetate are added dropwise at 40° C. to polyphosphoric acid (according to Example 1) and heated to 40° C. for another hour. The product is poured onto ice, filtered off with suction, suspended in cold acetone, and the residue is treated with warm 2 percent sodium hydroxide solution. The insoluble portion is recrystallized from acetone. Yellow crystals of 2-methyl-5.8-dimethoxy-thiochromone of M.P. 144° C. Yield 3–4 grams.

Example 9

10 milliliters of thiophenol and 10 milliliters of α-formylethyl propionate are added dropwise at 90° C. to polyphosphoric acid (according to Example 1) and maintained at 100° C. for a further hour. The product is poured onto ice and then filtered off with suction. White crystals of 3-methyl-thiochromone of M.P. 105–106° C. are obtained from ligroin. Yield 7 grams.

Example 10

10 milliliters of thiophenol and 12 milliliters of α-formylphenyl ethyl acetate of the formula

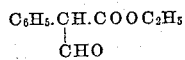

are added to polyphosphoric acid (according to Example 1) at 90° C. and heated to 100° C. for four hours. The product is poured onto ice and filtered off with suction. White crystals of 3-phenyl-thiochromone of M.P. 109–110° C. are obtained from a benzene-ligroin mixture. Yield 8 grams.

Example 11

A solution of 10 grams of 2-methyl-5-acetamino-thiophenol and 12 milliliters of benzoyl ethyl acetate is added in portions at 60° C. to polyphosphoric acid (according to Example 1) and the mixture is kept at 90–100° C. for a further 15 minutes. The product is poured onto ice, filtered off with suction and recrystallized from alcohol. From 2-phenyl-5-acetamino-8-methylthiochromone (M.P. 193–195° C.) the hydrochloride of 2-phenyl-5-amino-8-methylthiochromone is obtained by boiling with a mixture of alcohol and hydrochloric acid; the free base melts at 115° C. Yield 10–11 grams.

In the same way the following products can be produced:

(a) 2-(3′-nitro-phenyl) - 5 - amino-8-methyl-thiochromone of M.P. 211–212° C. for 2-methyl-5-acetaminothiophenol and m-nitrobenzoyl-ethyl acetate;

(b) 2-(4′-nitro-phenyl) - 5 - amino-8-methyl-thiochromone of M.P. 217° C. from 2-methyl-5-acetamino-thiophenol and p-nitrobenzoyl ethyl acetate;

(c) 2-(2′-chlorophenyl) - 5 - amino-8-methyl-thiochromone of M.P. 146–148° from 2-methyl-5-acetamino-thiophenol and o-chlorobenzoyl ethyl acetate;

(d) 2-(4′-chlorophenyl) - 5 - amino-8-methyl-thiochromone of M.P. 174–176° C. from 2-methyl-5-acetaminothiophenol and p-chlorobenzoyl ethyl acetate;

(e) 2-(4′-methoxy-phenyl) - 5 - amino-8-methyl-thiochromone of M.P. 138–139° from 2-methyl-5-acetaminothiophenyl- and p-methoxybenzoyl ethyl acetate.

Example 12

15 milliliters of 2.5-dimethyl-thiophenol and 18 milliliters of benzoyl ethyl acetate are added at 90° C. to polyphosphoric acid (according to Example 1) and heated to 100° C. for two hours. The product is poured onto ice and filtered off with suction. Crystals of 2-phenyl-5.8-dimethyl-thiochromone of M.P. 130–131° C. are obtained from a benzene ligroin mixture. Yield 10 grams. In a similar manner 2-phenyl-5-chloro-8-methyl-thiochromone of M.P. 143° C. is obtained from 2-methyl-5-chlorothiophenol and benzoyl ethyl acetate.

Example 13

10 milliliters of thiophenol and 12 milliliters of cyclohexanone-(2)-carboxylic acid ethyl ester-(1) are added to polyphosphoric acid (according to Example 1) at 90° C. and heated to 100° C. for 2 hours. Crystals of 1.2.3.4-tetrahydro-thioxanthone of M.P. 118° C. are obtained from ligroin. Yield 5–6 grams.

In a similar manner 1.2.3.4-tetrahydro - 5 - methyl-8-chlorothioxanthone of M.P. 131–132° C. is obtained from 2-methyl-5-chlorothiophenol and cyclohexanone - (2)-carboxylic acid ethyl ester-(1), and 1.2.3.4-tetrahydro-7-amino-thioxanthone of M.P. 233–234° C. from 4-acetamino-thiophenol and cyclohexanone-2-carboxylic acid ethyl ester after de-acetylation.

Example 14

10 grams of 2-methyl-5-acetaminothiophenol are dissolved in 12 milliliters of cyclohexanone-(2)-carboxylic acid ethyl ester-(1) and added at 80–90° C. to polyphosphoric acid (according to Example 1). The mixture is heated to 100° for 15 minuted and poured onto ice. From the acetamino compound thus formed the 1.2.3.4-tetrahydro-5-methyl-8-aminothioxanthone of M.P. 180° C. is obtained by saponification in alcoholic hydrochloric acid. Yield 11–12 grams.

Analogously, 1.2.3.4-tetrahydro-2.5-dimethyl - aminothioxanthone of M.P. 139–140° C. is prepared from 2-methyl-5-acetamino-thiophenol and 5-methyl - cyclohexanone-(2)-carboxylic acid ethyl ester-(1), and 1.2.3.4-tetrahydro-3.5-dimethyl-8-amino - thioxanthone of M.P. 145° C. from 2-methyl-5-acetamino-thiophenol and 4-methylcyclohexanone-(2)-carboxylic acid ethyl ester-(1).

Example 15

A solution of 15 grams of 2-methyl-5-acetamino-thiophenol in 15 milliliters of 4-methyl-Δ³,⁴-cyclohexenone-(2)-carboxylic acid ethyl ester-(1) is heated in polyphosphoric acid (according to Example 1) to 100° C. for one hour. The product is poured onto ice, filtered off with suction and de-acetylated. From benzene, crystals of 1.2-dihydro - 3.5 - dimethyl - 8 - amino-thioxanthone of M.P. 150–152° C. are obtained. Yield 11–12 grams. The 1.2-dihydro-3.5-dimethyl-8-chlorothioxanthone of M.P. 157–159° C. is obtained from 2-methyl-5-chlorothiophenol and 4-methyl-Δ$^{3,4}$-cyclohexenone-(2)-carboxylic acid ethyl ester-(1).

Example 16

15 grams of 2-methyl-5-acetamino-thiophenol are dissolved in 17 milliliters of cyclopentanone-(2)-carboxylic acid ethyl ester-(1) and heated in polyphosphoric acid (according to Example 1) to 100° C. for 5 minutes. The mixture is poured onto ice, filtered off with suction and de-acetylated. From alcohol, crystals of 2.3-trimethylene-5-amino-8-methyl-thiochromone of M.P. 200–201° C. are obtained. Yield 16 grams. The compound has the formula:

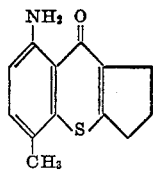

Example 17

10 grams of 2-methyl-5-acetamino-thiophenol and 11 grams of thiopyranone-(4)-carboxylic acid ethylester-(3) are briefly heated in polyphosphoric acid (according to Example 1) to 100° C. and then poured onto ice. From the acetamino compound thus formed the 1.3.4-trihydro-2-thio-5-methyl-8-aminothioxanthone of the formula

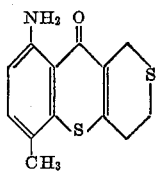

of M.P. 175–176° C. (alcohol) is obtained by de-acetylation. Yield 9–10 grams.

Example 18

To polyphosphoric acid (according to Example 1) 15 milliliters of 2.5-dimethoxy-thiophenol and 18 milliliters of benzoylethyl acetate are added dropwise at 60° C. The mixture is held at 60–70° C. for a further 10 minutes and poured onto ice. From benzene, the 2-phenyl-5.8-dimethoxy-thiochromone of M.P. 189–190° C. is obtained. Yield 17–18 grams.

In a similar manner 2-(4'-methoxy-phenyl)-5.8-dimethoxy-thiochromone of M.P. 159–160° C. is obtained from 2.5-dimethoxy-thiophenol and p-methoxy benzoyl ethyl acetate.

Example 19

11 milliliters of thiophenol and 20 grams of γ-pyridoyl ethyl acetate are added to polyphosphoric acid (according to Example 1) of 80° C. The mixture is heated to 100° C. for 30 minutes, poured onto ice and the yellow crystals (phosphate) are filtered off with suction. By decomposition with a sodium hydroxide solution the 2-(4'-pyridyl)-thiochromone of M.P. 171–172° C. (methanol) is obtained. Yield 9–10 grams. In a similar manner 2-(4'-pyridyl)-5.8-dimethyl-thiochromone of M.P. 180° C. is obtained from 2.5-dimethyl-thiophenol and γ-pyridoyl ethyl acetate.

Example 20

15 grams of 2-methyl-5-acetamino-thiophenol and 18 milliliters of hexahydrobenzoyl ethyl acetate are added at 80° C. to polyphosphoric acid (according to Example 1). The mixture is heated to 100° C. for 15 minutes, poured onto ice, filtered off with suction and boiled for 3 hours with a mixture of ethanol and hydrochloric acid.

On the addition of a sodium hydroxide solution the 2-cyclohexyl-5-amino-8-methyl-thiochromone of M.P. 99–101° C. (methanol) is obtained. Yield 11–12 grams.

Example 21

15 milliliters of 2.5-dimethoxy-thiophenol and 18 milliliters of cyclohexanone-2-carboxylic acid ethyl ester-(1) are added dropwise at 60–70° C. to polyphosphoric acid (according to Example 1) and the mixture is held at 70° C. for 10 minutes. It is poured onto ice, filtered off with suction, and the 1.2.3.4-tetrahydro-5.8-dimethoxy-thioxanthone of M.P. 142–144° C. (benzene) is obtained. Yield 18–19 grams.

Analogously, the 1.2.3.4-terahydro-5.8-dichlorothioxanthone of melting point 138–140° C. is prepared from 2.5-dichlorothiophenol and cyclohexanone-2-carboxylic acid ethyl ester-(1).

Example 22

The operations described in the Example 19 are repeated with the modification that instead of 20 grams of γ-pyridoyl ethyl acetate there are employed 20 grams of β-pyridoyl ethyl acetate. The 2-(3'-pyridyl)-thiochromone of the melting point 158–159° C. is obtained.

By condensing 2.5-dimethylthiophenol-β-pyridoyl ethyl acetate in the manner described in Example 19 2-(3'-pyridyl)-5.8-dimethylthiochromone of the melting point 162–163° C. is obtained.

Example 23

8 milliliters of thiophenol and 12 milliliters of α-thenoylethyl acetate are added at 80° C. to polyphosphoric acid as in the previous examples. The mixture is heated for 30 minutes to 100° C. and poured on ice. 2-(α-thienyl)-thiochromone of the melting point 127–128° C. is obtained in a yield of 9–10 grams.

Analogously, 2-methyl-5-acetamino-thiophenol and α-thenoyl ethyl acetate are condensed. After de-acetylation 2-(α-thienyl)-5-amino-8-methyl-thiochromone of the melting point 162–163° C. is obtained.

I claim:

In the process for the production of thiochromones in which a thiophenol which is unsubstituted in an ortho position to the mercapto group and which is selected from the group consisting of thiophenol and substituted thiophenols, the substituents of said substituted thiophenols being selected from the group consisting of methyl, halogeno, acetamino, and methoxy radicals, is condensed with a compound having the formula:

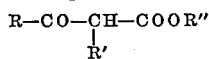

wherein R is a radical selected from the group consisting of hydrogen, methyl, phenyl, halogeno phenyl, nitrophenyl and methoxy phenyl, R' is a radical selected from the group consisting of hydrogen, methyl, and phenyl, and R'' is a lower alkyl radical, by reacting the reactants at a temperature between about 15 and 150° C., in the presence of a condensing medium, the improvement which comprises effecting said reacting in the presence of polyphosphoric acid as said condensing medium, said polyphosphoric acid being present in an amount at least equal to the amount of said thiophenol.

References Cited in the file of this patent

UNITED STATES PATENTS 2,792,407    Heininger _____ May 14, 1957

OTHER REFERENCES

Hurd et al.: Journal of the American Chemical Society, vol. 76, pp. 5065–5069 (1954).

Simonis et al.: Deutsche Chemische Gesellscraft (Berichte), vol. 49, pp. 768–780 (1916).

UNITED STATES PATENT OFFICE

CERTIFICATE OF CORRECTION

Patent No. 2,923,716            February 2, 1960

Friedrich Bossert

It is hereby certified that error appears in the printed specification of the above numbered patent requiring correction and that the said Letters Patent should read as corrected below.

Column 3, line 4, for "2-ethyl-5-" read -- 2-methyl-5- --; line 27, for "-acetamminothiochromone" read -- -acetamino-thiochromone --; column 4, line 10, for "for" read -- from --; line 57, for "100° for 15 minuted" read -- 100° C. for 15 minutes --.

Signed and sealed this 13th day of December 1960.

(SEAL)
Attest:

KARL H. AXLINE            ROBERT C. WATSON
Attesting Officer            Commissioner of Patents